Sept. 15, 1942.   G. E. PALMER   2,295,805
NETWORK DISTRIBUTION APPARATUS
Filed June 2, 1939   4 Sheets-Sheet 1

Patented Sept. 15, 1942

2,295,805

UNITED STATES PATENT OFFICE 2,295,805

NETWORK DISTRIBUTION APPARATUS

Granville E. Palmer, Cambridge, Mass., assignor to P & B Electric Co., Wakefield, Mass., a corporation of Massachusetts Application June 2, 1939, Serial No. 277,022

17 Claims. (Cl. 175—294)

This invention relates to apparatus for network distribution systems, and more especially for comparatively large systems such as are found in large cities wherein various sections of the city are connected to one or more power-supply lines by a considerable number of feeders, each of which contains a transformer to step down high voltage of the power-supply lines to the lower voltage of the network. The various sections of the network are of course interconnected so that, if a short circuit or other excessive load occurs in any portion of the network, there is a tendency on the part of energy in the entire network to flow toward such point of low resistance. This sometimes results in a temporary reversal of power flow in one or more feeders of a network. Current-regenerating apparatus in a network also is liable to result in temporary reverse-power flow in feeders under certain conditions.

A short circuit in the low-voltage network may burn itself off and thus cure this difficulty automatically without endangering any considerable portion of the network. When a short circuit occurs in a high-voltage transmission line or feeder, the power flow is so much greater, owing to the high voltage, that such short circuit should be instantly cut out of the system so as to avoid extensive damage. A short circuit of this kind results in a reverse-power flow of considerable magnitude in one or more of the feeders so that protective apparatus for automatically disconnecting such feeders should be instantly responsive to such conditions. Protective apparatus of various kinds have been designed and put into use but they have been subject to one or more objectionable characteristics. The ideal protective apparatus should be designed and constructed so as to act instantly in certain emergency conditions such as a short circuit in a high-voltage power line or feeder but to be insensitive to temporary conditions which are not destructive but which are such as to cause protective apparatus now in use to operate unnecessarily, thus causing undesired interruption in the service. As a matter of economy, it is a practical necessity that the size of conductors used in a network system be selected so that they may be used, without undue heating, to carry currents of a selected magnitude. Protective apparatus should be designed to open the circuit in feeders which are dangerously over-loaded and in consequence over-heated, but it is desirable that under certain conditions brief over-loads be permitted such as will not endanger the system. The interval of time during which an over-load can be safely accommodated will, of course, depend upon the magnitude of the over-load, such time interval being in inverse ratio to the over-load. Hence, it is important that the protective apparatus be designed to operate to permit reasonable over-loads for brief periods, the duration of such periods depending upon the magnitude of the over-load. Since in polyphase distribution systems the operation of such units as motors depends upon the proper phase sequence in the system, the protective apparatus should also be responsive to changes in phase sequence.

In protective apparatus heretofore invented, reverse-power devices have depended upon at least a substantial fraction of normal potential in the feeder for their operation. Since a short circuit in the feeder near the protective apparatus is liable to be accompanied by such potential conditions that the voltage is nearly zero, reverse-power devices of this kind have frequently failed to operate in response to conditions under which operation is particularly desirable.

It is an object of the present invention to provide protective apparatus for the conductors of a network system in which the said apparatus provides protection to any portion of the conductors of the system in which current magnitudes, or the time duration thereof, are in excess of the current-carrying capacity of the said conductors and where the limit of time imposed on such protective operation is determined either by a direction of electrical energy in the conductors having certain current magnitudes, or by certain other magnitudes of current irrespective of energy direction thereof.

For a more complete understanding of the invention, reference may be had to the following description thereof, and to the drawings of which

Figures 7 and 8 are elevational views of a thermostatic relay device in different positions of operation.

Figure 10 is a side elevation of a reverse-power device, the wiring of which is indicated in Figure 9.

Figure 11 is a front elevation of the device shown in Figure 10.

Figure 1:
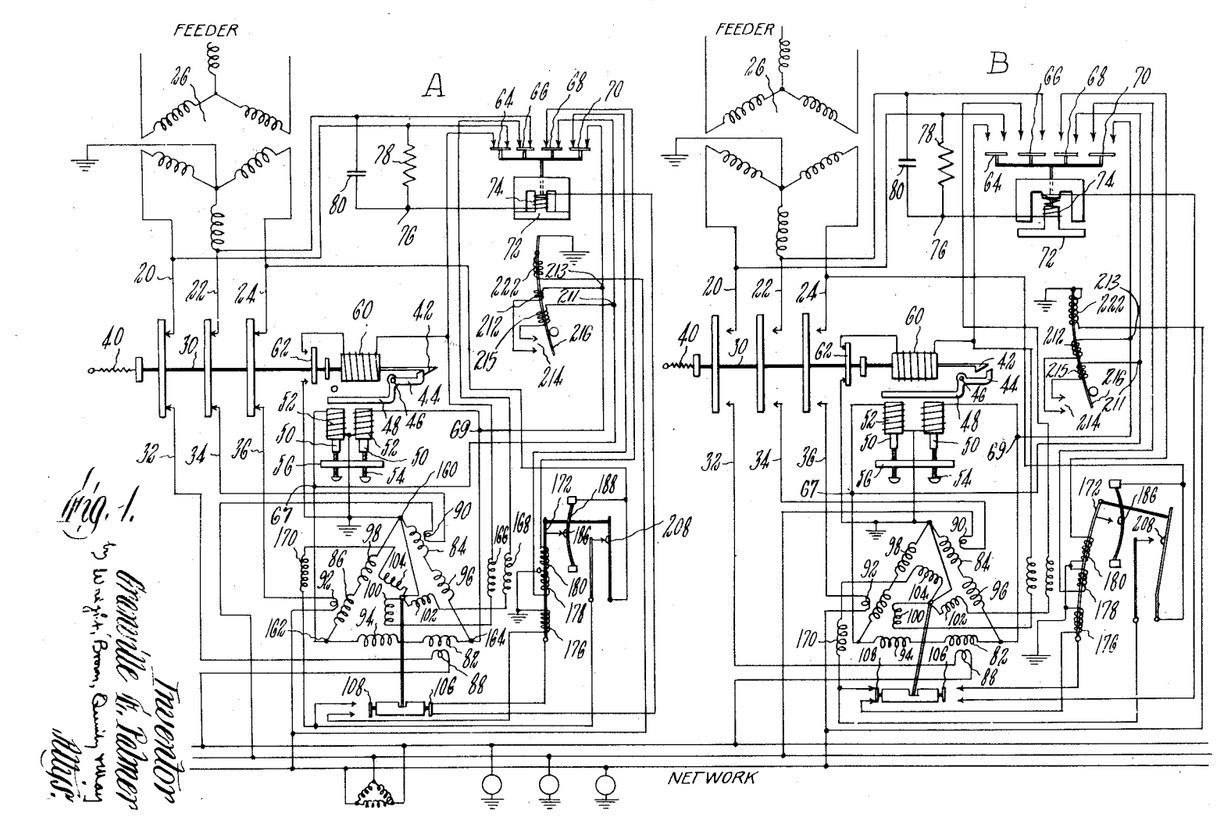
Figure 1 is a diagrammatic showing of two feeders to a network in a polyphase distribution system, together with protective apparatus embodying the invention associated with each feeder.
Figure 2:
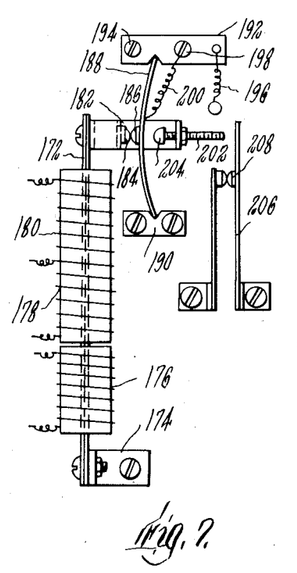
Figure 2 is a plan view of a reverse-power device, the wiring of which is indicated in Figure 1.
Figure 3:
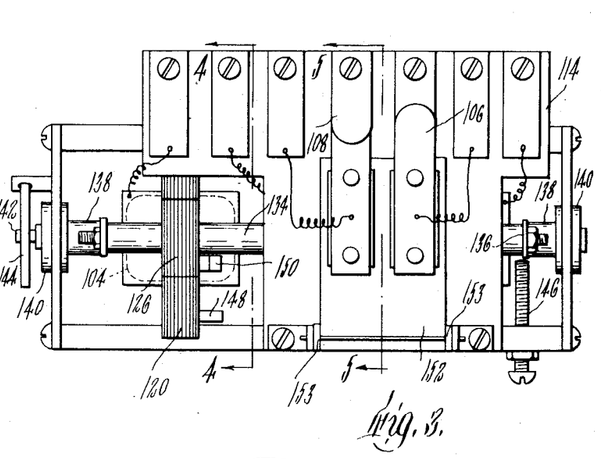
Figure 3 is a front elevation of the device shown in Figure 2.

Figure 1 illustrates diagrammatically two feeders from a high-potential transmission line (not shown) to a network, each of the feeders being provided with a protective apparatus embodying the invention. The two diagrams, denoted A and B respectively, show identical protective apparatus having parts in different positions of operation, diagram A showing the apparatus in condition for normal operation of the feeder. Since the apparatus shown in diagrams A and B is the same, similar reference characters for both diagrams will be used.

Figure 1 illustrates a three-phase system but it is to be understood that a greater or lesser number of phases can be employed with corresponding modifications of the protective apparatus. In the feeder which, as shown, comprises three wires 20, 22 and 24, and which may include a ground wire, there is a transformer 26 by which the high-voltage of the transmission line is stepped down to the voltage of the network. Between the transformer 26 and the network is a circuit breaker 30 normally connecting the feed wires 20, 22 and 24 on the supply side of the breaker with corresponding wires 32, 34 and 36 on the network side of the breaker. Suitable means such as a spring 40 may be employed to urge the breaker 30 toward its open-circuit position. The breaker is normally held in its closed position by a dog 42 which is mounted on the stem or shank of the breaker and is engaged by a latch 44 which is pivoted as at 46, the latch having an arm 48 engageable by either one or both of a pair of armatures 50 within corresponding solenoid coils 52 which are inductively connected to the feeder as hereinafter described. Sufficient energization of either coil 52 causes its armature 50 to move up and strike the arm 48 to release the breaker 30, whereupon the breaker is instantly opened by the spring 40. The initial position of each armature 50, and hence the degree of energization of its coil 52 for opening the breaker, may be readily adjusted by corresponding supports 54 which are screw-threaded in a fixed bracket 56.

A closing coil 60 is provided for automatically closing the breaker under certain conditions. This coil is connected through a pallet switch 62 to ground, and the other end of the coil through a control switch 64 to the feed wire 20.

The control switch 64 is one of the group of such switches, the others being indicated as 66, 68 and 70, these switches being normally held closed by a relay device including a movable armature 72 which is normally magnetized by a coil 74. This coil, an ohmic resistance 78 and a condenser 80 are Y-connected as at 76 to the three feed wires 24, 20 and 22, respectively. The impedance of the coil 74, the resistance 78, and capacity of the condenser 80 are so selected that, when the phase sequence and voltage of the feeder are normal, the coil 74 is energized to maintain the control switches 64, 66, 68 and 70 closed. Thus, failure of voltage in the feeder or reversal of phase sequence will deenergize the relay coil 74 enough to result in the simultaneous opening of the four control switches. Since one of these control switches is in series with the closing coil 60. it is evident that the circuit breaker will not be automatically closed by the coil 60 unless conditions of voltage and phase sequence in the feeder are normal.

In each of the feed wires 32, 34 and 36, on the network side of the breaker 30, are connected primaries 88, 90 and 92, respectively, of current transformers. The corresponding secondaries 82, 84 and 86 are each connected in series with one of three stator coils 94, 96 and 98 of the reverse-power device illustrated in Figures 2 and 5. These three groups of current transformer secondary and stator coils are connected in a conventional delta arrangement, to which are connected the two trip coils 52 in conventional open delta, with the common connection 160 of the two trip coils 52, in open delta, being grounded. Thus under any conditions of balanced or unbalanced current in the feeders, one or both of the trip coils 52 may be energized in proportion to the current flowing through the feeders, regardless of the voltage of the feeders. The reverse-power device which is illustrated in Figures 2 to 5 is provided with a rotor having rotor coils 100, 102 and 104 arranged to cooperate respectively with the stator coils 94, 96 and 98. The rotor is adapted to rock through a limited angle in response to reverse-power flow in the feeder exceeding a predetermined magnitude so as to open a normally closed switch 106 and to close a normally open switch 108 as hereinafter described.

Figure 4:
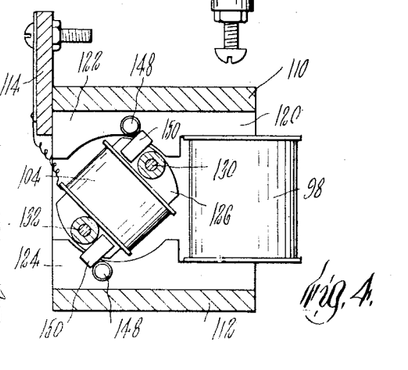
Figure 4 is a section on the line 4—4 of Figure 3.
Figure 5:
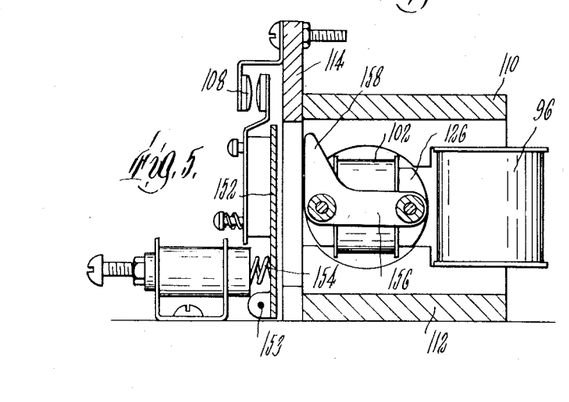
Figure 5 is a section on the line 5—5 of Fig. 3.

Referring to Figures 2 to 5, inclusive, the reverse-power relay device may conveniently be in the form of a unit having a frame consisting of a top plate 110, a bottom plate 112 and a front plate 114. Between the top and bottom plates are mounted suitable cores 116, 118 and 120 for the stator coils 94, 96 and 98, respectively. As shown in Figure 4, each of these cores is made with a pair of pole pieces 122 and 124 between which is rockably mounted the corresponding rotor coil with its armature, these armatures being designated as 126. The rotor coils are mounted for simultaneous rocking movement about a common axis. To this end, a pair of stems 130 and 132 are passed through suitable holes in the armatures 126, tubular spacing sleeves 134 being employed to space the armatures and hence the rotor coils apart. Near the ends of the stems 130 and 132 are cross-heads 136 having stub shafts 138 journaled in suitable bearings 140. One of these stub shafts has a reduced end portion 142 projecting beyond the bearing, a spiral spring 144 being attached thereto in such a manner as to exert a torque on the shaft tending to rotate the rotor coils in a clockwise direction, as viewed in Figures 4 and 5, from an active position to an inactive position. The normal or inactive position of the rotor is illustrated in Figure 5. This position is determined by a suitable stop element 146 which, as indicated, is preferably adjustable and which is engaged by one of the cross-heads 136 to limit the clockwise rotation of the rotor. On one of the stator coil cores, for example the core 120, a pair of stop pins 148 are mounted, these stop pins being engageable by a pair of corresponding lugs 150 on the corresponding armature 126. The pins 148 and the lugs 150 are made of magnetic material, so that, when the rotor is rocked to the active position shown in Figure 4 by reverse-power flow in the feeder, the lugs 150 engage the pins 148 and are held in contact therewith by magnetic attraction so long as either the core 120 or the armature 126 is magnetized.

Mounted on the front plate 114 is a rockable support member 152 which is pivoted at 153 and which carries the movable elements of the switches 106 and 108, the stationary elements of these switches being mounted directly on the plate 114. As indicated in Figure 5, when the support is in its normal position, the switch 108 is open. An adjustable compression spring 154 may be provided to hold the support 152 in the normal position shown. The rotor carries a cam element 156 which rocks therewith and which has a nose 158 adapted to engage the support 152 and to rock the support against the pressure of the spring 154 so as to close the switch 108 and to open the switch 106.

Figure 6:
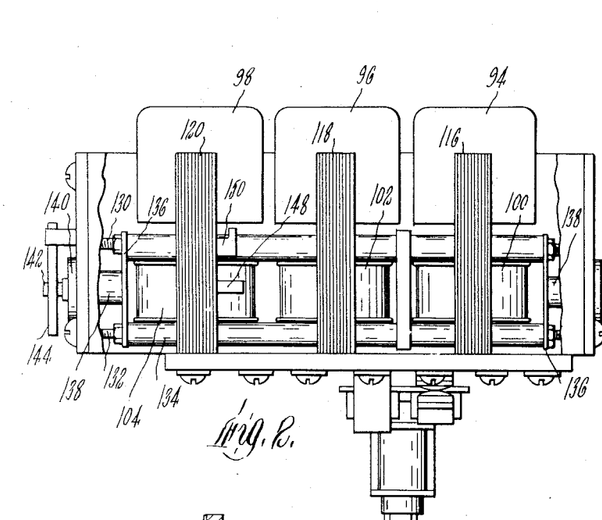
Figure 6 is a schematic showing of some of the circuits illustrated in Figure 1.

The reactances in the circuits containing the trip coils and the secondary transformer coils are selected so that, with the proper adjustment of the elements 54 which support the armatures 50 of the trip coils, the trip coils will be sufficiently energized by a predetermined current in the feeder, say 25% of the current capacity of the feeder wires, to cause the breaker to be opened. According to the invention, operative energization of the trip coils 52 by currents of such size is under ordinary conditions prevented by means of shunt circuits which by-pass considerable of the current from the current transformers which would otherwise flow through the trip coils. These shunt circuits are clearly illustrated in Figure 6, as well as in Figure 1. As shown, one of the trip coils 52 is by-passed by a shunt circuit which extends from the point 67 to a ground connection and contains the control switch 68. The other trip coil 52 is by-passed by a shunt circuit which extends from the point 69 to a ground connection and contains the switch 70. It is evident that since these switches are normally kept closed by the relay coil 74, any deenergization of the coil 74 will result in opening the switches 68 and 70, thus opening the corresponding shunt circuits of the trip coils 52 so that these trip coils will then be operatively responsive to relatively small currents in the feeder. It is also evident that, if the current in the feeders rises to a sufficiently high value, the relatively small current which passes through the trip coils will be sufficient to trip the breaker latch even though the shunt circuits which by-pass the trip coils are not opened.

Conditions in the system which ordinarily are responsible for excessive flows of power from the network to the supply line are usually caused by short circuits. If such occur near the feeder, the reverse-power flow is ordinarily accompanied by a heavy current flow and a voltage approaching zero. Owing to the reactance of the adjacent transformer 26, the current often lags considerably behind the voltage so that an exceedingly low power-factor results. If the impedance in the rotor circuit in the reverse-power device were pure resistance, or nearly so, at very low power-factor conditions of load, the magnetic fluxes in the rotor and stator would be nearly 90° out of phase, and poor operation of the device would result since the rotor torque is entirely dependent on the components of the magnetic fluxes of the rotor and stator which are in phase. Thus the maximum torque would be obtained at high power-factor load conditions. In emergencies resulting in a very low power-factor, however, such rotor windings would be inefficient owing to the abnormal phase conditions of voltage and current in the feeder. Since reliable operation under emergency conditions is of great importance, the circuits containing the rotor coils are provided with considerable reactance. In order to avoid undesirable induction conditions between the rotor and stator coils which would result from large inductances in the rotor coils themselves, the rotor coils are preferably made to have relatively low inductances, additional impedance units 166, 168 and 170 having considerable reactance being connected in series with the respective rotor windings 100, 102 and 104.

It is desirable that, after the reverse-power devices has been operated by a reverse flow of energy in the feeder, the device be held against return to its normal position during a predetermined interval of delay. In such interval, the abnormal situation which caused the reverse flow of power may be cured, in which case the automatic closing of the breaker will resume normal services through the feeder. If the short circuit or other emergency has not been corrected within such interval of delay, the breaker will immediately be reopened. This interval of delay prevents undesirable "pumping" of the apparatus which is objectionable and which often occurs in protective apparatus of the kind now in use under certain conditions. This interval of delay may conveniently be obtained by means of a thermostatic device indicated in Figure 1 and illustrated in detail in Figures 7 and 8. As shown, this device may comprise a bimetallic element 172 which is straight at ordinary temperatures but which curves when heated. This element may be suitably mounted on a bracket 174 to which one end of the element is secured. Mounted on the element so as to surround it is a heating coil 176. Also mounted on the same element may be a pair of additional heating coils 178 and 180, the purpose of which is hereinafter explained. At the other end of the element is secured an S-shaped member 182 which is of metal and carries a contact point 184. This contact point normally engages a corresponding contact point 186 mounted on a spring strip 188. This spring is flexed between a fixed bracket 190 and a rockable bracket 192 which rocks on a pivot 194 against the tension of a spring 196. The spring 188 is electrically connected to a suitable terminal 198 by a connecting wire 200. The S-shaped member 182 also carries an adjustable screw 202 which is insulated therefrom. This screw has a head 204 which engageable by the spring strip 188 when the latter is moved to the position indicated in Figure 8. This takes place when sufficient curvature is imparted to the bimetallic element 172 by heat from one or more of the coils thereon to press the strip 188 beyond the point where it is straightened. The spring strip then snaps to the position shown in Figure 8, thus engaging the screw 202 and moving the screw against an arm 206 so as to open the switch 208, one element of which is carried by the arm 206.

When the reverse-power device is operated in response to reverse flow of power in the feeder so as to cause the breaker 30 to open, the switch 106 is opened and the switch 108 is closed by the operation of the device as previously described. The closing of the switch 108 connects the heating coil 176, one end of which is grounded, to the feeder wire 24 through the switch 208, the latter being normally closed as shown in diagram A of Figure 1. If there is energy in the feeder on the supply side of the breaker, the coil 176 begins to heat the thermostatic element 172 which, after a predetermined interval, results in the opening of the switch 208. This disconnects the heater coil 176 from the feeder so that the coil begins to cool. After a sufficient cooling interval during which the bimetallic element 172 tends to straighten itself against the spring resistance of the strip 188, the switch 208 is closed.

In the meantime, the operation of the reverse-power device has caused the breaker 30 to open. This stops the flow of current in the feeder wires and deenergizes the current coils of the stator. If the feeder is still energized on the supply side of the breaker, one of the rotor coils 104 remains energized so that the rotor is held in its active position by magnetic attraction betwen the pins 148 and the lugs 150 (Figure 4) until the switch 208 is opened by the thermostatic device, thus deenergizing the rotor coil 104 which is grounded at one end and connected at the other end through the impedance 170 and the switch 208 to the feed wire 24. The rotor coil 100, which is grounded at one end and connected at the other end through the impedance 166 and the switch 64 to the feed wire 20, and the rotor coil 102, which is grounded at one end and connected at the other end through the impedance 168 and the switch 66 to the feed wire 22, are open-circuited due to the switches 66 and 64 being opened when the reverse-power device operates as hereinbefore described. Thereupon the spring 144 restores the rotor to its inactive position, opening the switch 108 and closing the switch 106. The switch 108 thus deenergizes the heater coil, while the switch 106 reconnects the point 76 with the feed wire 24 through the relay coil 74 and the switch 186. If then or thereafter normal conditions of voltage and phase sequence are restored in the feeder, the relay coil 74 is reenergized to close the control switch 84. This at once results in energization of the closing coil 60 to close the breaker 30.

As previously described, the trip coils 52 have shunt circuits by-passing them to prevent undesired operative energization of the coils by moderate currents under ordinary conditions. In actual practice there are liable to be occasions when a feeder will be subject to a brief overload not arising from any emergency conditions. In such cases it is desirable that service be not interrupted unless the overload is of such magnitude or duration as to endanger the conductors or their insulation. To this end, the shunt circuits which by-pass the trip coils 52 and contain the switches 68 and 70, also include respectively the heater coils 178 and 180. The characteristics of these coils are such that currents in the feeder within the current-carrying capacity of the feeder wires do not result in sufficient energization of the coils 178 and 180 to open the switch 186. If, however, the feeder is moderately overloaded, the coils 178 and 180 will heat the bimetallic element 172 to open the switch 186 if the magnitude and duration of such overload would be sufficient to endanger the feeder itself. Thus, the greater the overload, the more promptly will the switch be opened. Since the relay coil 74 must be energized by currents through the switch 186, as well as through the switch 106, opening the switch 186 opens the control switches 64, 66, 68, 70 instantly, thus opening the shunt circuits and permitting the trip coils to operate immediately.

In the operation of a network, there may be occasions when it becomes necessary to disconnect the entire network from its sources of energy. When energy is thereafter turned into the dead network, the initial load on the feeders is liable to be considerably in excess of the normal load owing to the relatively large starting currents required by electric motors and lamps which may be connected in the network when the energy is turned on. As such overload may be of such magnitude as to cause the trip coils to operate at once in spite of the shunt circuits previously described, additional shunt circuits are provided to by-pass the coils 52 so as to prevent for a brief interval premature reopening of the breakers when energy is turned on to energize a dead network unless short-circuit conditions or their equivalent exist in the network. One of these additional shunt circuits extends from the point 211 through a heater coil 212, a thermostatic switch 214, the bimetallic element 216 of the switch, and thence to a ground connection. The other additional shunt circuit extends from the point 213 through a heater coil 215, the switch 214 and the element 216 to the ground. Both of the coils 212 and 215 are arranged on the bimetallic element 216 so as to open the switch 214 if either coil is sufficiently heated. Thus when, after the entire network has been deenergized, the feeders are energized so that the breakers 30 automatically close, the switch 214 is closed and the auxiliary shunt circuit is effective in preventing the brief starting overload from causing the breakers to open again immediately. If, however, a serious short circuit exists in the network near a feeder, the coils 212 promptly cause the switch 214 to open, whereupon the breaker 30 is immediately opened as previously described. The auxiliary shunt is intended to function only when energy is initially supplied to a dead network. Ordinarily the switch 214 is kept open by a heater coil 222 which is a potential coil always connected to the network so that the coil 222 is constantly energized as long as there is energy in the network, regardless of whether the corresponding breaker 30 is open or closed.

Figure 9:
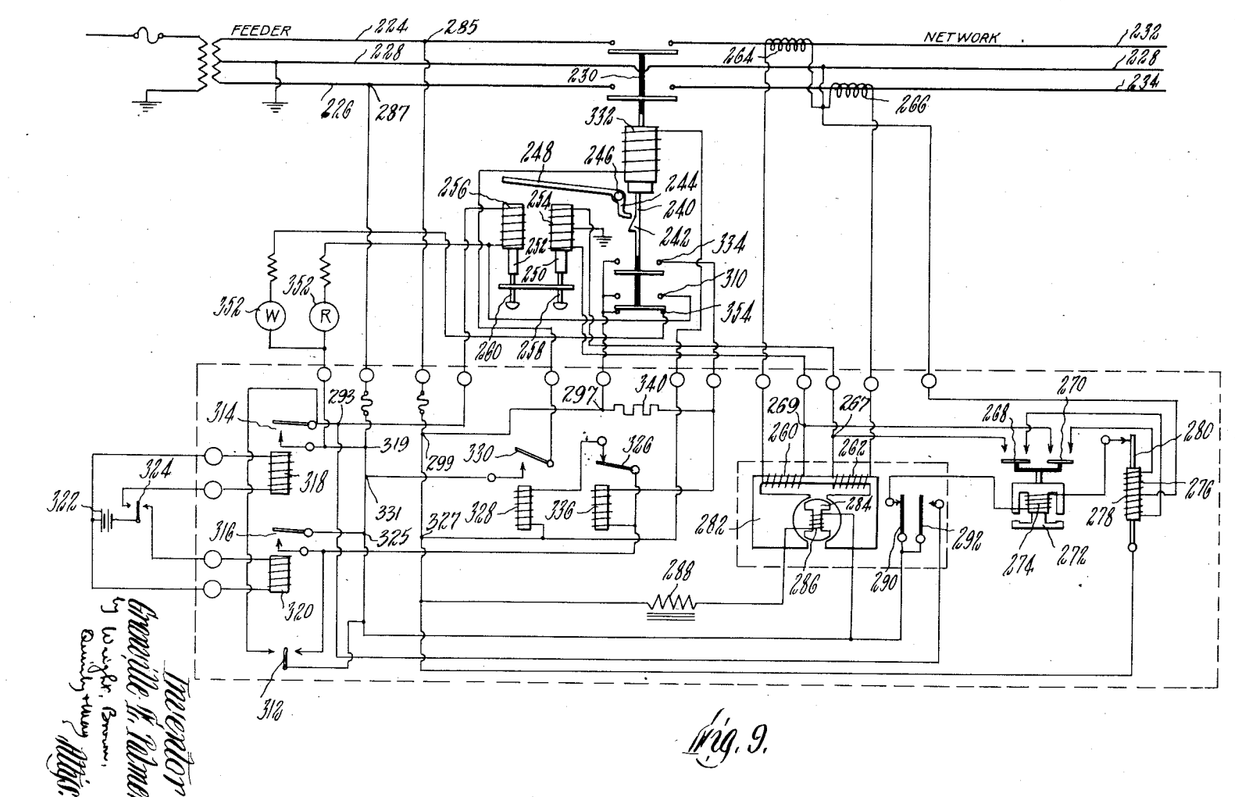
Figure 9 is a diagrammatic showing of a modified form of the invention as applied to a single-phase system.

Figure 9 illustrates a network protector apparatus as applied to a single-phase system and having some characteristics differing from the apparatus hereinbefore described. These additional features, however, are applicable to a polyphase system as well as to the single-phase system illustrated. As shown, a feeder consisting of three wires 224, 226 and 228 (the latter being a ground wire) is connected by a breaker 230 to a network having three wires 232, 234 and 228. The breaker may be opened by gravity or by any equivalent means such as a spring (not shown). The breaker is mounted on a stem 240 having a dog 242 which is engaged by a latch 244 pivoted as at 246 so as to retain the breaker in closed position until the latch is tripped as hereinafter described. The latch is provided with a trip arm 248 engageable by either or both of a pair of armatures 250 and 252 of solenoid coils 254 and 256 respectively. The initial positions of the armatures are adjustable by means of screw-threaded supports 258 and 260 which may be elevated or lowered to regulate the degree of energization necessary in the coils 254 or 256 to raise the armatures sufficiently to strike the arm 248 so as to trip the latch 244 and cause the breaker to open.

The coils 254 are current coils which operate and are controlled in similar fashion to the trip coils 52 as shown in Figure 1. Each of the coils 254 is connected in series with one of the stator coils 260 and 262 of a reverse-power device and with a corresponding current-transformer secondary coil 264 or 266. These current-transformer secondary coils are so constructed that, if all of the current therefrom is directed through the trip coils which are in series therewith, a current flow in the feeder of say 25% of its current-carrying capacity will be sufficient to energize the trip coils sufficiently to open the breaker. Such magnetization of the trip coils is, however, prevented ordinarily by shunt circuits which by-pass part of the current around the trip coils. The shunt circuit which by-passes the trip coil 254 extends from the point 267 through a control switch 268 and a thermostat heat coil 278 to the ground. The shunt circuit by-passing the trip coil 256 extends from the point 269 through a control switch 270 and a thermostat heater coil 276 to the ground. The control switches 268 and 270 are ordinarily held closed by a relay device 272 energized by a coil 274. The heater coils 276 and 278 surround a bimetallic thermostat element 280 which is also a switch member in series with the relay coil 274. Since the switches 268 and 270 are kept closed by continuous energization of the relay coil 274, it is evident that, if the heater coils 276 and 278 are sufficiently energized to open the switch 280, the shunt circuits will then be instantly broken, permitting the current from the transformers 264 and 266 to energize the trip coils 254 operatively so that the breaker 230 thereupon opens immediately.

Figures 6, 8, 10, 11:
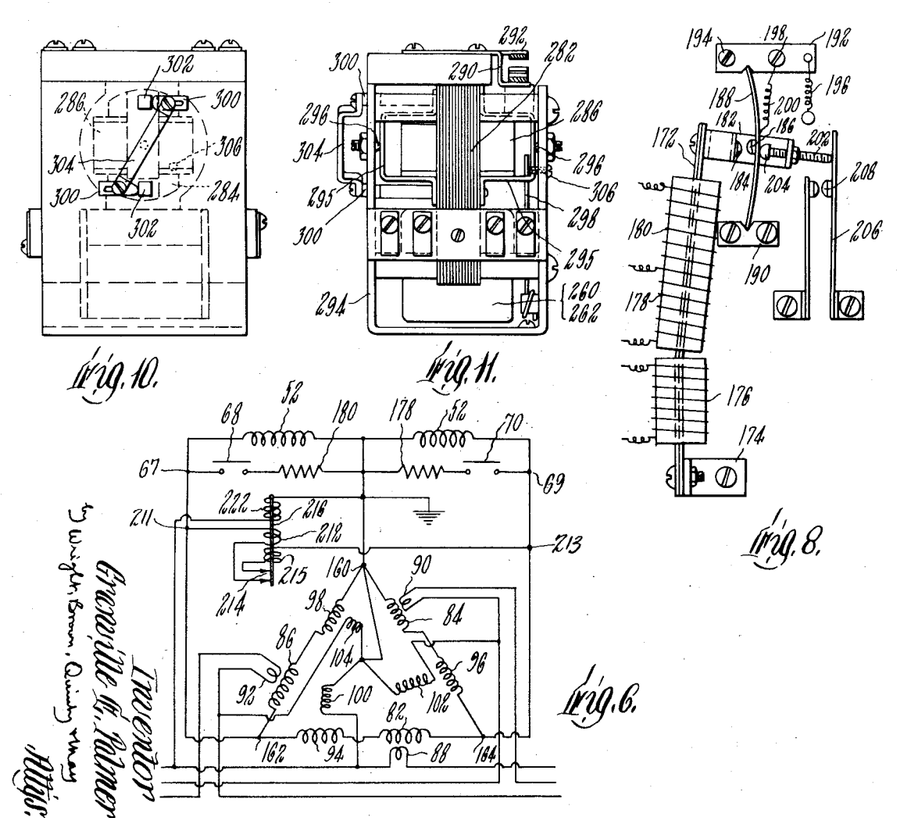

A single-phase reverse-power device is indicated in Figure 9 and consists essentially of a stator core 282 on which are wound the stator coils 260 and 262. The device also includes a rotor 284 having a potential coil 286 thereon, this potential coil being connected through a suitable external impedance unit 288 to the feeder wire 224 at the point 285 on the supply side of the breaker 230, the other terminal of the coil 286 being connected to the feeder wire 226 at the point 287. Rocking movement imparted to the rotor 284 results in simultaneous opening of the normally closed switch 290 and closing of the normally open switch 292. Mechanism suitable for this purpose is illustrated in Figures 10 and 11 in which the stator coil 282 is mounted on a suitable non-magnetic support frame 294. The rotor 284 includes a frame 295 which is mounted on suitable bearings 296. The rotor is resiliently maintained in the inactive position indicated in Figures 9 and 10 by means of a spring 298. This position is adjustably determined by a pair of adjustable stops 300 of magnetic material mounted on the frame 294, these stops being engaged by a pair of squared pins 302 of magnetic material secured to the core of the rotor coil 286. By adjustment of the stops 300, the inactive position of the rotor with respect to the stator core 282 can be adjusted to regulate the sensitivity of the device to reverse power in the feeder.

The stops 300 are connected by a bar 304 of magnetic material providing a substantially closed magnetic circuit for flux in the rotor core when the pins 302 are in contact with the stops. Since the rotor coil 286 is a potential coil, the flux in its core will depend upon the voltage in the feeder, and, when ordinary voltage is in the feeder, the pins 302 will be strongly held against the stops 300 by magnetic attraction. Hence, when reverse-power flow in the feeder is due to some condition not involving a substantial drop in voltage, the torque on the rotor imparted by the reverse-power flow is opposed by the magnetic attraction between the pins 302 and the stops 300, and undesirable opening of the breaker is avoided. A short circuit, however, results in a drop in the voltage to nearly zero and a resultant demagnetization of the pins 302, so that the magnetic opposition to rocking movement of the rotor becomes negligible.

A suitable stop element 306 may be mounted in the frame 294 as an abutment for the rotor frame 295 to determine the active position of the rotor.

The switch 290, which is opened by movement of the rotor to its active position, is in series with the relay coil 274 so that operation of the reverse-power device results in deenergization of the relay coil 274 and consequent breaking of the shunt circuits around the trip coils 254 which then operate to open the breaker 230. The switch 292, which is closed by operation of the reverse-power device, is in series with the trip coil 256, this switch and coil being normally connected across the feeder wires on the supply side of the breaker 230, a pallet switch 310 being also included in this circuit which extends from the point 287 through the switch 292, the point 293, the coil 256, the switch 310, and the points 297 and 299 to the point 285 on the feeder 224. The pallet switch 310 is closed when the breaker is closed but opens when the breaker opens. Thus, when the reverse-power device operates, the latch 244 may be tripped by energization of the potential coil 256 or by operative energization of the current coils 254 or by both.

It is sometimes desirable to control the breaker 230 manually. For this purpose a manually-operable double-throw switch 312 may be located on the premises and may be operated to open or close the breaker 230. For remote control, a pair of relay switches 314 and 316 may be provided in parallel with the switch 312, these switches being operable from any desired point by energization of corresponding relay coils 318 and 320 by means of a suitable source of energy such as a battery 322 and a manual double-throw switch 324. If it is desired to open the breaker 230 by means of the switch 324, this switch is closed in such a manner as to energize the coil 318, thus closing the switch 314. The latter is connected across the feeder wires 224 and 226 in a circuit which extends from the point 287 through the point 319, the switch 314, the potential coil 256, the pallet switch 310, and the points 297 and 299 to the point 285. Since the switch 310 is always closed when the breaker 230 is closed, the closing of the switch 314 completes the foregoing circuit breaker through the trip coil 256 which trips the latch 244, resulting in the opening of the breaker 230.

If the breaker is open and it is desired to close it manually, the switch 324 is operated to energize the relay coil 320 so as to close the switch 316. This closes a circuit extending from the point 287 on the feeder wire 226 through the point 325, the switch 316, a switch 326, a coil 328 of a relay switch 330, and the point 327 to the point 285 on the feeder 224. This causes the switch 330 to close, thereby closing a circuit from the point 287 through the point 331, the switch 330, the closing coil 332 for the breaker 230, and the point 327 to the point 285 on the feeder 224. The consequent energization of the closing coil 332 closes the breaker 230. When the breaker closes, the pallet switch 334 also closes a circuit from the point 285 through the points 299 and 297, the switch 334, a relay coil 336, the closed switch 316, and the point 325 to the point 287 on the feeder 226, energizing the relay coil 336 so that the switch 326 is thereby opened, breaking the circuit through the coil 328 which allows the switch 330 to open and thus breaks the circuit through the closing coil 332. Thus the closing coil 332 is at once deenergized when the breaker closes, regardless of whether the switch 316 is left open or closed.

When the switch 316 is closed to energize the coil 328, it also closes a circuit extending from the point 287 through the point 325, the switch 316, the coil 336, a resistor 340, and the points 297 and 299 to the point 285, but the current through the coil 336 and resistor 340 is insufficient to cause the switch 326 to open. When, however, the pallet switch 334 closes, the resistor 340 is by-passed and the switch 326 is opened. If conditions in the network or feeder when the breaker 230 is closed are such as to cause the breaker to open automatically as previously described, the pallet switch 334 likewise opens, breaking the shunt circuit around the resistor so that the current through the coil 336 is reduced. This current, however, while insufficient to open the switch 326, is sufficient to hold it in its open position. Hence, this switch is held open until the switch 316 has been opened. Thus a single closing of the switch 316 results in a single closing of the breaker 230, that is, if conditions in the system when the breaker closes are such as to energize the coils 254 or 256 operatively, the breaker opens immediately and remains open even though the switch 316 is kept closed, since the switch 326 is held open until the switch 316 is opened. The various relay switches illustrated in Figure 9 are yieldingly maintained in the positions shown by suitable springs in the customary manner. If desired, suitable tell-tale lamps 350 and 352 may be installed in any convenient place to indicate whether the breaker 230 is open or closed. The lamp 350 is lighted through a pallet switch 354 when the breaker is open. The lamp 352 is lighted through the pallet switch 310 when the breaker is closed.

It is evident that various modifications and changes may be made in the embodiment of the invention herein illustrated and described without departing from the spirit or scope thereof as defined in the following claims.

I claim:

1. Network protective apparatus for a feeder connecting a network to a power line, said apparatus comprising a circuit breaker in said feeder, and breaker-operating mechanism responsive to reverse-power flow in said feeder exceeding a substantial predetermined magnitude and to current flow in said feeder in excess of a predetermined magnitude to open said breaker, said operating mechanism including a circuit connected to said feeder and containing a solenoid energizable by current flow of predetermined magnitude in the feeder to cause said breaker to open, a shunt circuit by-passing said solenoid, a switch in said shunt circuit, and a reverse-power device for opening said switch when reverse power exceeding a predetermined magnitude flows in said feeder.

2. Network protective apparatus for a feeder connecting a network to a power line, said apparatus comprising a circuit breaker in said feeder, and breaker-operating mechanism including a circuit connected to said feeder and containing a solenoid energizable by current flow in said feeder to cause said breaker to open when said current exceeds a predetermined magnitude, a shunt circuit having a predetermined impedance and by-passing said solenoid, the impedance in said shunt circuit being so related to the impedance in the solenoid circuit as to divert sufficient current from said solenoid to prevent operative energization thereof when the current in the feeder is less than a predetermined value substantially above the rated capacity of the feeder, a switch in said shunt circuit, and a reverse-power device for opening said switch in response to reverse-power flow in said feeder exceeding a predetermined magnitude to render said shunt ineffective.

3. Network protective apparatus for a feeder connecting a network to a power line, said apparatus comprising a circuit breaker in said feeder, and breaker-operating mechanism including a circuit connected to said feeder and containing a solenoid energizable by current flow in said feeder to cause said breaker to open when said current exceeds a predetermined magnitude, a shunt circuit having a predetermined impedance and by-passing said solenoid, the impedance in said shunt circuit being so related to the impedance in the solenoid circuit as to divert sufficient current from said solenoid to prevent operative energization thereof when the current in the feeder is less than a predetermined value substantially above the rated capacity of the feeder, a switch in said shunt circuit, and control means for automatically opening said switch in response to reverse-power flow in said feeder exceeding a predetermined magnitude and in response to predetermined conditions of magnitude and duration of current flow in said feeder.

4. Network protective apparatus for a feeder connecting a network and a power line, said apparatus comprising a circuit breaker in said feeder, and breaker-operating mechanism including a circuit connected to said feeder and containing a solenoid energizable by current flow in said feeder to cause said breaker to open when said current exceeds a predetermined magnitude, a shunt circuit having a predetermined impedance and by-passing said solenoid, the impedance in said shunt circuit being so related to the impedance in the solenoid circuit as to divert sufficient current from said solenoid to prevent operative energization thereof when the current in the feeder is less than a predetermined value greatly in excess of the rated capacity thereof, a switch in said shunt circuit, and automatic means for opening said switch, said automatic means including a reverse-power device connected to said feeder and operatively energizable by a reverse flow of power in the feeder exceeding a predetermined magnitude, said automatic means also including a thermostatic device operatively responsive to predetermined conditions of magnitude and duration of current flow in said feeder.

5. Network protective apparatus for a feeder connecting a network to a power line, said apparatus comprising a circuit breaker in said feeder, and breaker-operating mechanism including a normally closed circuit inductively connected to said feeder and containing a trip coil energizable to cause said breaker to open and a normally open circuit connected across the feeder and containing a closing coil energizable to cause said breaker to close, a shunt circuit having a predetermined impedance and by-passing said trip coil, the impedance in said shunt circuit being so related to the impedance in the trip coil circuit as to divert sufficient current from said trip coil to prevent operative energization thereof when the current in the feeder is less than a predetermined value greatly in excess of the rated capacity thereof, a switch in said shunt circuit, a switch in series with said closing coil, a relay coil normally energized to maintain both said switches closed, control means for deenergizing said relay coil in response to reverse-power flow exceeding a predetermined magnitude in said feeder, and thermostatic delay means for preventing reenergization of said relay coil within a predetermined interval subsequent to the deenergization thereof.

6. Network protective apparatus for a system including a network, a power line, and a plurality of feeders connecting the network to the power line, said apparatus comprising a circuit breaker in a feeder and automatic means for operating said circuit breaker, said operating means including a solenoid inductively connected to said feeder and energizable to cause said breaker to open, a normally closed shunt circuit having a predetermined impedance and by-passing said solenoid, the impedance in said shunt circuit being so related to the impedance in the solenoid circuit as to divert sufficient current from said solenoid to prevent operative energization thereof when the current in the feeder is less than a predetermined value exceeding a predetermined magnitude, a relay circuit connected across said feeder on the supply side of said breaker, a relay switch in said shunt circuit normally held closed by energy in said relay circuit, a normally closed switch in said relay circuit, and a reverse-power device for opening the last-named switch in response to reverse-power flow in the feeder exceeding a predetermined magnitude.

7. Network protective apparatus for a system including a network, a power line and a plurality of feeders connecting a network to the power line, said apparatus comprising a circuit breaker in a feeder and automatic means for operating said breaker, said operating means including a normally open circuit connected across the feeder on the supply side of the breaker and containing a closing coil energizable by potential in the feeder to close said breaker, a control switch in series with said closing coil, a normally closed circuit inductively connected to said feeder and containing a trip coil energizable by currents in the feeder to cause said breaker to open, a normally closed shunt circuit having a predetermined impedance and by-passing said trip coil, the impedance in said shunt circuit being so related to the impedance in the trip coil circuit as to divert sufficient current from the trip coil to prevent operative energization thereof when the current in the feeder is less than a predetermined value of predetermined magnitude exceeding the rated current-carrying capacity of the feeder, a control switch in said shunt circuit, a reverse-power device connected to said feeder, a relay device normally maintaining both said control switches closed, and means operating said relay device automatically in response to actuation of said reverse-power device and in response to loss of voltage in the feeder to open both said control switches simultaneously.

8. Network protective apparatus for a feeder connecting a network to a power line, said apparatus comprising a circuit breaker in said feeder, automatic breaker-opening mechanism including a current coil connected to said feeder so as to be energizable by current flow in said feeder to cause said breaker to open, a shunt circuit around said coil, a switch in said shunt circuit, and thermostatic means for closing said switch when the network is completely deenergized and for opening said switch after a brief interval following a reenergization of the deenergized network, said means including a heating coil constantly connected to said network.

9. Network protective apparatus for a feeder connecting a network to a power line, said apparatus comprising a circuit breaker in said feeder, automatic breaker-opening mechanism including a current coil connected to said feeder so as to be energizable by current flow in said feeder to cause said breaker to open, a shunt circuit around said coil, a switch in said shunt circuit, and thermostatic means for closing said switch when the network is completely deenergized and for opening said switch after the network has been reenergized, said means including a thermostatic element movable to open and close said switch, a heater coil for said element constantly connected to said network and energized thereby to maintain said switch open while the network is energized, and a supplementary heater coil for said element connected inductively to said feeder and in series with said switch, said coil being arranged to assist the first said heater coil in opening said switch when power is turned into the network after complete deenergization thereof, whereby excessive currents in the feeder when the network is reenergized hasten the opening of said switch in accordance with the magnitude of said currents.

10. Network protective apparatus for a feeder connecting a network to a power line, said apparatus comprising a circuit breaker, latch means for retaining said breaker in closed position, and tripping means for tripping said latch to permit said breaker to open, said tripping means including a solenoid coil, a plunger within said coil and magnetically operable thereby to trip said latch, a reverse-power relay device having a stationary current coil and a rotatable potential coil, means connecting said solenoid coil and said current coil in series with each other and inductively with said network, means connecting said potential coil with said feeder on the supply side of said breaker, a normally closed shunt circuit by-passing said solenoid coil and adapted to divert sufficient current from said solenoid coil to prevent operative energization thereof by normal power flow in said feeder, and means operable by said actuation of said reverse power device to open said shunt circuit.

11. Network protective apparatus for a three-phase system including a three-wire feeder connecting a network and a power line, said apparatus comprising a circuit breaker in said feeder, a pair of trip coils either of which is energizable to cause said breaker to open, a reverse-power device having three stator coils and three corresponding rotor coils rotatable together as a unit, said rotor coils being potential coils connected across the wires of said feeder, a current transformer in each feeder wire, each said transformer having a secondary coil connected in series with a respective stator coil of said reverse-power device, the paired stator and transformer coils being delta-connected, the said trip coils being connected in open delta with the delta-connected coils, a shunt normally-closed circuit by-passing each of said trip coils, and means responsive to actuation of said reverse-power device to open said shunt circuits.

12. Network protective apparatus for a feeder connecting a network to a power line, said apparatus comprising a circuit breaker in said feeder and breaker-operating mechanism including a circuit across said feeder containing a potential coil energizable to cause said breaker to close, a current coil connected to the feeder energizable thereby to cause said breaker to open, a second circuit across the feeder containing a potential coil energizable to cause the breaker to open, and control means for said breaker-opening coils, the control means for the current opening coil including a shunt circuit having a predetermined impedance and by-passing said coil, the impedance of said shunt circuit being so related to the impedance in the current coil as to divert sufficient current from the current coil to prevent operative energization thereof when the current in the feeder is less than a predetermined value greatly in excess of the rated capacity thereof, a normally closed switch in said shunt circuit, a reverse-power device connected to said feeder and responsive to reverse-power flow exceeding a predetermined magnitude in said feeder, and relay means operable by said reverse-power device to open said switch, the control means for the potential opening coil including a normally open switch in series with said coil operable by said reverse-power device, auxiliary manually-operable control switches remote from said coils, and means operatively connecting said auxiliary switches respectively with the two said potential coils whereby said breaker may be opened or closed at will by operation of said auxiliary switches.

13. Network protective apparatus for a feeder connecting a network to a power line, said apparatus comprising a circuit breaker in said feeder, automatic breaker-closing mechanism responsive to normal voltage conditions in the feeder on the supply side of the breaker, automatic breaker-opening mechanism responsive to heavy current flow in said feeder in excess of predetermined magnitude and duration and responsive to reverse-power flow in said feeder exceeding a predetermined magnitude, a pair of auxiliary manually-operable switches remote from said automatic mechanisms, and means operatively connecting the two auxiliary switches with said mechanisms for opening and closing said breaker by manipulation of said switches.

14. Network protective apparatus for a feeder connecting a network to a power line, said apparatus comprising a circuit breaker in said feeder, automatic breaker-closing mechanism including a circuit across the feeder containing a potential coil energizable from the feeder to cause the breaker to close in response to normal voltage conditions in the feeder on the supply side of the breaker, automatic breaker-opening mechanism including a second circuit across the feeder containing a potential coil energizable from the feeder to cause the breaker to open in response to reverse-power flow in the feeder exceeding a predetermined magnitude, a pair of auxiliary manually-operable switches remote from said coils, and means operatively connecting said switches and coils for manual opening and closing of said breaker at will.

15. Network protective apparatus for a feeder connecting a network to a power line, said apparatus including a circuit breaker in said feeder, electromagnetic means for opening said breaker automatically and instantly in response to current flow in said feeder in a reverse energy direction in excess of a predetermined fraction of the rated current-carrying capacity of the feeder and also in response to an overload current in either direction of a magnitude greatly in excess of the rated current-carrying capacity of the feeder, said apparatus also including means for opening said breaker in response to overload currents in the feeder less than said magnitude after delays varying according to the degrees of overload, said apparatus also including means for causing said breaker to close automatically in response to normal voltage conditions in the feeder on the supply side of the breaker.

16. Network protective apparatus for a feeder connecting a network to a power line, said apparatus including a circuit breaker in the feeder, electromagnetic means operating independently of voltage conditions in the feeder for opening said breaker responsive to and immediately upon the occurrence of current in the feeder of a predetermined magnitude, and means electromagnetically operated in response to reverse current flow in the feeder for conditioning the first named electromagnetic means to respond to a fraction of said predetermined current magnitude to open the breaker.

17. Network protective apparatus for a feeder connecting a network to a power line, said apparatus including a circuit breaker in the feeder, electromagnetic means operating independently of voltage conditions in the feeder for opening said breaker responsive to and immediately upon the occurrence of current in the feeder of a predetermined magnitude, and means electromagnetically operated in response to reverse current flow in the feeder for conditioning the first-named electromagnetic means to respond to a fraction of said predetermined current to open the breaker, said reverse-current-responsive means including a normally closed relay switch operable in response to low voltage in the feeder to effect said conditioning of the first-named electromagnetic means.

GRANVILLE E. PALMER.